United States Patent [19]

George

[11] Patent Number: 4,848,669
[45] Date of Patent: Jul. 18, 1989

[54] FLUID FLOW CONTROL NOZZLES

[75] Inventor: David A. George, Surbiton, United Kingdom

[73] Assignee: British Aerospace PLC, London, England

[21] Appl. No.: 185,557

[22] Filed: Apr. 22, 1988

[30] Foreign Application Priority Data

Apr. 29, 1987 [GB] United Kingdom ............... 8710157

[51] Int. Cl.[4] .................. B05B 1/32; B05B 15/08; F24F 13/065; B60H 1/34
[52] U.S. Cl. .................... 239/539; 239/541; 239/581.2; 239/587; 98/40.02
[58] Field of Search ............ 239/587, 537–539, 239/581.1, 541, 581.2; 98/40.02, 2, 1.5; 251/175, 145

[56] References Cited

U.S. PATENT DOCUMENTS

| | | | |
|---|---|---|---|
| 2,814,978 | 12/1957 | Sallou | 98/40.02 |
| 3,238,861 | 3/1966 | Fromme | 98/40.02 |
| 3,319,893 | 5/1967 | Rodgers et al. | 239/581.1 |
| 3,814,001 | 6/1974 | Hill | 98/40.02 |
| 4,221,336 | 9/1980 | Diamond | 239/587 |
| 4,524,679 | 6/1985 | Lyons | 98/40.02 |

FOREIGN PATENT DOCUMENTS

| | | | |
|---|---|---|---|
| 0571761 | 9/1945 | United Kingdom | 98/40.02 |
| 742236 | 12/1955 | United Kingdom | 98/40.02 |
| 768139 | 2/1957 | United Kingdom | . |
| 826791 | 1/1960 | United Kingdom | . |
| 1376302 | 12/1974 | United Kingdom | . |

Primary Examiner—Andres Kashnikow
Assistant Examiner—Karen B. Merritt
Attorney, Agent, or Firm—Kerkam, Stowell, Kondracki & Clarke

[57] ABSTRACT

The present invention provides an air flow control nozzle in which a ball, which has air-flow passageways therethrough, is at least partially supported in a housing (or cowl) by an air cushion formed by the pressure of air at the nozzle inlet end, in order to alter the direction of airflow from the nozzle, the orientation of the ball can be changed by simply turning the ball on the air cushion.

15 Claims, 3 Drawing Sheets

FLUID FLOW CONTROL NOZZLES

FIELD OF THE INVENTION

This invention relates to control nozzles for use in air ventilation systems, particularly in aircraft cabins or cockpits.

BACKGROUND ART

Existing cockpit air conditioning systems provided for small aircraft such as military fighter or trainer aircraft are supplied with air which is bled from the aircraft engine. The air is passed through a heat exchanger to be cooled and then circulated around the cockpit, under pressure, through supply pipes on each side of the pilot's seat. Apertures in the supply pipe allow the air to escape and circulate inside the cockpit. The apertures usually contain controllable ventilation nozzles which are positioned so as to be within easy reach of the seated pilot and to enable him to direct and adjust the flow of air for maximum comfort within the cockpit. The ventilation nozzles presently used are of a type which comprise a series of louvres of vanes rotatably mounted within each aperture in the air supply pipe. The louvres are angled to deflect the air in a chosen direction as it passes through them. The whole louvre assembly is fixed within a retaining ring rotatably mounted on the circumference of the aperture so that by rotating the ring clockwise or anti-clockwise the pilot is able to direct the air flow. In addition the nozzle usually has a flow control valve mounted in it which enables the pilot to alter the volume and rate of air flow through the louvres. The flow control valve usually comprises a disc which obstructs the air flow through the vent by an amount depending on the position of the disc within the vent. The position of the disc is adjustable by a separate rotatable knob provided in the centre of the nozzle which may be rotated independently of the rotation of the louvre assembly.

A drawback with such louvre systems is that they are expensive to manufacture even by moulding techniques as they may be made from as many as nine separate components all of which require individual manufacture.

Apart from the cost and complexity of manufacturing the present nozzles they tend to be unreliable in operation. One problem is that they are prone to variable frictional forces around the edge of the vent making it difficult to maintain the louvre assembly in the required position. Sometimes the louvre assemblies move round of their own accord due to aircraft vibration and the pilot has to continually re-adjust them which is tedious from the pilot's point of view. Furthermore, the rotatable knob controlling the air control valve protrudes into the cockpit and can sometimes catch in the pilot's clothing and restrict his movements which could obviously be awkward or dangerous particularly if the pilot's concentration is distracted during a manoeuvre.

Ventilation nozzles for road vehicles are known, e.g. from British Patent Nos. 743 236; 768 139; 826 791 and 1 376 302 and from U.S. Pat. Nos. 3,814,001 and 4,524,679; such nozzles have a spherical ball provided with air passageways therethrough and the ball if fixed in a part-spherical retaining socket in the manner of a ball-and-socket joint so that the ball can be rotated within the socket to direct air in any desired direction. However, the ball and/or the socket can become worn through use thereby reducing the friction between the ball and the socket which results in the ball being held slackly by the socket and vibration can cause the ball to slip out of its desired orientation requiring continual re-adjustment. More seriously, however, the member can seize in the retaining socket, e.g. through the accumulation of dirt or through scuffing of the ball and/or the socket and when this occurs the member cannot be rotated at all (or can only be rotated with difficulty).

It is an object of the present invention to provide an air flow control nozzle that overcomes the above problems and which is simple in construction and cheap to manufacture. It is a further object of the present invention to provide an air flow control nozzle which is compatible with existing aircraft ventilation systems and which can be readily retrofitted to these with little or no modification thereto.

DISCLOSURE OF THE INVENTION

The present invention provides an air flow control nozzle in which a ball, which has air-flow passageways therethrough, is at least partially supported in a housing (or cowl) by an air cushion formed by pressurized air supplied to the nozzle inlet by an air duct and the orientation of the ball can be changed by simply turning the ball on the air cushion, thereby dispensing with the disadvantages retaining sockets of the above-described nozzles and avoiding the frictional forces between the ball and the retaining socket.

Thus, according to the present invention, there is provided a ventilation nozzle comprising: a cowl having (a) an inlet for receiving pressurised air, (b) a substantially circular aperture and (c) a cavity connecting the inlet and the aperture together, and the nozzle also includes a substantially spherical member located in the cavity and having at least one hole extending therethrough, the spherical member having a diameter greater than that of the aperture and being rotatable to direct air passing through the said hole(s) in any desired direction, wherein the spherical member is free to be moved within the cavity towards and away from the said aperture and wherein the member is urged into contact with the aperture under the influence of the pressure of air at the cowl inlet.

BRIEF DESCRIPTION OF THE DRAWINGS

The invention will now be described in greater detail, by way of example only, with reference to the following drawing in which.

DETAILED DESCRIPTION OF THE DRAWINGS

Figure 1:
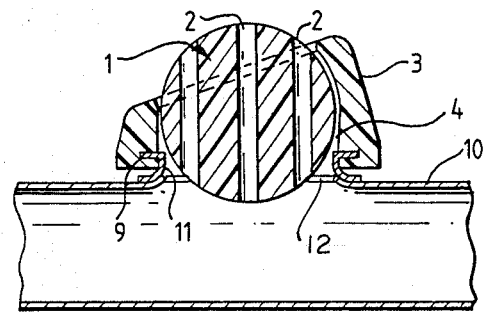
FIG. 1 is a section view through an air flow control nozzle according to the present invention.
Figure 2:
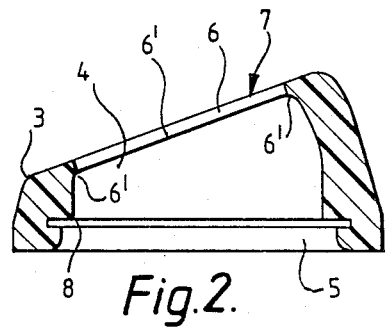
FIG. 2 is a section through a cowl portion only of the nozzle of FIG. 1.
Figure 3:
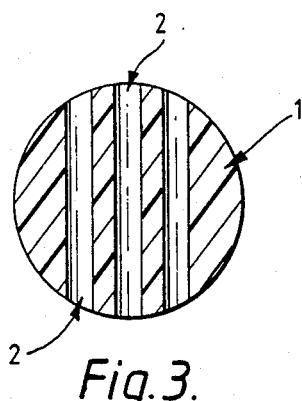
FIGS. 3 and 4 are respectively a sectional view taken along the line A—A of FIG. 4 and a top view of a spherical member only of the nozzle of FIG. 1.
Figure 4:
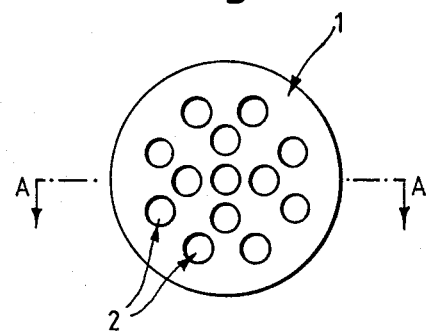

Referring initially to FIGS. 1 to 4, the air flow control nozzle comprises a spherical member 1 made of plastics material, such as glass-reinforced nylon, with a plurality of parallel-sided circular cross-section air holes 2 extending through it and a cowl 3 of resilient plastics material, e.g. a synthetic rubber (for example a polyurethane rubber). The cowl 3 has a cavity 4 having an inlet 5 at one end and a circular aperture 6 at the other end; the lip 6' at the bottom of aperture 6 is designed to form a seat for spherical member 1 and makes line-contact with the member 1 when the latter is urged against it, although, because of the resilience of the cowl 3, the conctact area between the lip 6' and the member 1 increases as the member is urged with increased force against the lip 6'. The diameter of the spherical member 1 is greater than the diameter of the aperture 6 and so the member 1 cannot be forced through the aperture 6. The cowl 3 has a face 7 in which the aperture 6 is formed, the face being inclined at approximately 20° with respect to the base of the cowl. The cowl 3 has an internal circumferential groove 8 which is capable of fitting over a flange 9 on a conventional circumferential aperture ring 11 of an air supply duct 10.

Referring to FIG. 1, the nozzle is assembled by introducing the spherical member 1 through the inlet 5 until it abuts the lip 6' of the aperture 6; initially, the spherical member 1 can be in any orientation. The cowl 3 is then attached to the air supply duct 10 by pulling it over the flange 9 of the ring 11 so that the flange 9 is seated in the groove 8 in the cowl 3. Although the external diameter of the flange 9 is larger than the internal diameter of the cowl inlet 5, the cowl material is flexible enough to deform and allow the cowl to be pushed over the top of the flange 9 until the edge of the flange engages with the internal circumferential groove 8. When the cowl 3 is correctly in position it returns to its normal shape, and the cowl is thus fixed to the flange and it can only rotate when sufficient force is exerted on it. The diameter of the spherical member 1 is larger than the inside diameter of the flange 9 and the spherical member is thus held captive in the cavity 4 of the cowl 3; the size of the cavity is sufficient to allow the member 1 to be moved towards and away from aperture 6 and to allow the member to be rotated to direct air at any desired angle.

The inclined face 7 of the cowl enables the spherical member 1 to be rotated within the cowl 3 so as to direct the maximum number of air holes 2 towards the pilot. In this example the angle of inclination of face 7 is 20° but other angles might be more suited to a particular cockpit and pilot seating arrangement.

The rings 11 are standard items attached to the circumference of apertures located in the air ventilation ducting of an aircraft. They usually provide attachment points for standard louvred nozzles of the type described in the introduction to the present specification.

Figure 6A:
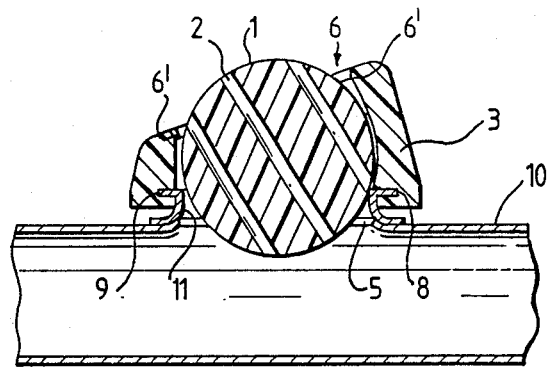
FIGS. 6a, 6b and 6c are schematic diagrams of the nozzle of FIG. 1 in a depressed, released and closed position respectively.
Figure 6B:
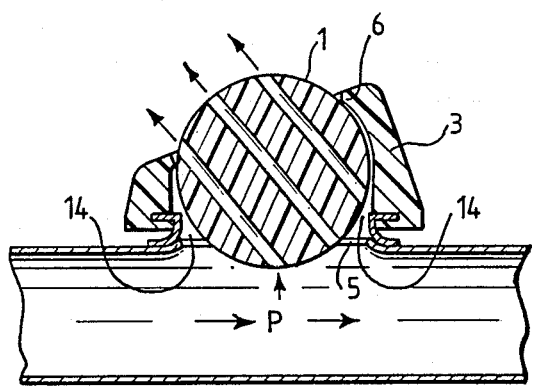
Figure 6C:
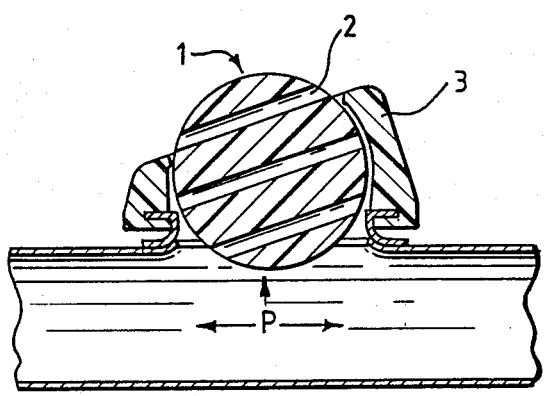

FIGS. 6a to c show an air vent of the present invention attached by a ring 11 to an aperture 12 in an air ventilation duct 10 which in use is supplied by high pressure cooling air from the aircraft's engine. In a typical cockpit installation there will be two ducts 10, one either side of the pilot, each with at least one nozzle conveniently positioned on the duct adjacent to the pilot's seat.

FIG. 6a shows the nozzle when the pressure in duct 10 is at atmospheric pressure when the spherical member 1 rests on the ring 11. When the air pressure in duct 10 is increased to its operational value P, the pressure raises the member and urges it into contact with the lip 6' of aperture 6, which prevents the spherical member 1 from rotating of its own accord (see FIG. 6b).

The spherical member 1 is maintained in a fixed orientation with respect to the cowl 3 by air pressure P until the pilot wishes to adjust the direction of airflow when he simply has to touch the spherical member lightly (so that member 1 no longer makes contact with the lip 6') and rotate the member 1 to its new desired position. The member 1 is supported on a cushion of air which functions as an air bearing allowing the pilot to rotate and point the air holes in any desired direction with light thumb movements. When the pilot has re-oriented the spherical member 1 he simply releases it and the air pressure P restores it to the fixed position in which it presses against aperture lip 6' of the cowl but at the new chosen orientation. Air then flows from the duct 10 through the holes 2 in a direction determined by the new orientation. During adjustment, there are no frictional forces acting on the member (as was the case with the prior art nozzles) and so the member cannot seize in one fixed position. This lack of contact and associated frictional forces between the member 1 and the aperture is a result of having the lip 6' of aperture 6 being a sharp edge as will most readily be seen in FIG. 2. The contact between the member 1 and the lip 6' prevents the member from rotating of its own accord when subject to vibration.

If the pilot wishes to turn the air flow off altogether he has only to rotate the spherical member 1 until the holes 2 are parallel to the aperture 6 as shown in FIG. 6c. In this position air will no longer be able to flow through the holes 2 because there is no pressure drop across the holes.

When the aircraft is not in use, the pressure in the air duct 10 will fall to atmospheric pressure causing the member 1 to fall back into the cavity 4 within the duct (as shown in FIG. 6a). When the pressure in the air duct is restored (FIG. 6b), the pressure will again push the member 1 against the lip 6' of aperture 6 and in general the member 1 will retain the orientation it had prior to the pressure being removed. This is particularly true if the distance 14 between the member 1 and the ring 11 is small; as will be apparent, the distance 14 must not, of course, be reduced to zero. It will be appreciated that if the nozzle is mounted so that gravity tends to move the member 1 against aperture 6, e.g. if the nozzle shown in FIG. 6b is mounted below the air duct 10 rather than on top of it, then the member 1 will not fall back into cavity 4 and the orientation of the member will inevitably be maintained when the pressure P in the duct 10 is removed. In practice, the nozzle will often be mounted on its side and the spherical member 1 will rest on the lip 6' and the flange 11 when the pressure in the duct 10 is only atmospheric.

Figure 5:
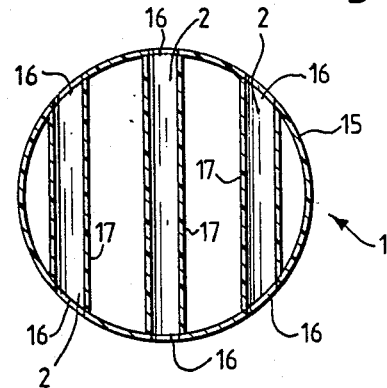
FIG. 5 is a section through an alternative form of spherical member to that shown in FIGS. 3 and 4.
Figure 7:
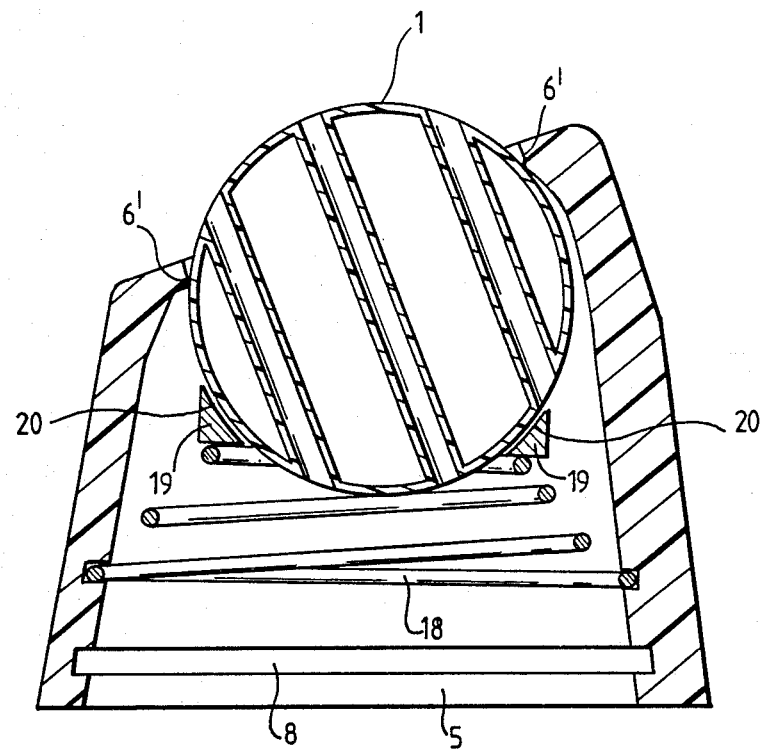
FIG. 7 is a section view through a further embodiment of an air flow control nozzle of the present invention.

The operation of the nozzle described above makes use of the high air pressures which are normally available in aircraft air conditioning systems but the nozzle may also be used for low air pressure systems, for example for use in road vehicles. If the force on the spherical member due to the pressure in the air supply duct 10 is insufficient by itself to maintain the member 1 pressed against the lip 6' then it is possible to adapt the nozzle shown in FIGS. 1 to 4 and 6 for use in such low-pressure systems; thus, the size of the member 1 may be increased, thereby increasing correspondingly the force generated by the air pressure in the duct 10. Furthermore, the member 1 can be made lighter by making it of less dence material and/or by making the member 1 hollow; as shown in FIG. 5, the member 1 has a hollow shell 15 provided with orifices 16 with opposed pairs of orifices being connected by tubes 17 providing the air flow between the inlet 5 and the atmosphere. It is also possible to use a mechanical spring 18 (see FIG. 7) to supplement the air pressure to urge the spherical member 1 against lip 6'; as shown in FIG. 7, the member 1 is supported by the spring on a ring 19 having a part-spherical inner surface 20 so that the friction between ring surface 19 and the member 1 is as low as possible. The force exerted by the spring 18 together with the force resulting from the air pressure P must be sufficient to urge the member against lip 6' so that it retains its position in use; preferably the spring force is at most barely sufficient to support the weight of member 1. In low pressure applications, when the member 1 is made sufficiently light and/or large, the spring can be dispensed with.

In order to avoid light reflecting from the nozzle, which could distract the pilot or driver, the outer surfaces of the nozzle are preferably matt black, which also increases the sliding resistance between the member 1 and the lip 6' thereby reducing the likelihood of the member being rotated unintentionally, e.g. due to vibration.

Other arrangements are possible without departing from the scope of the invention. For instance, the bore holes 1 could be made at different angles to each other or could even be curved. The cowl 3 need not be fixed to the flange but may be rotatably mounted on the flange so that it can be gripped by the pilot and rotated. The pilot can then not only change the direction of airflow by rotating the spherical member as before, but may also adjust the optimum full flow position for his particular body height.

I claim:

1. An air flow control nozzle comprising:
   a cowl having an inlet for receiving pressurized air, a substantially circular aperture and a cavity connecting the inlet and the aperture together, and
   a substantially spherical member located in the cavity and having at least one hole extending therethrough, the spherical member having a diameter greater than that of the aperture and being rotatable to direct air passing through the said hole in any desired direction, wherein the spherical member is free to be moved within the cavity towards and away from the said aperture and wherein, in use, the spherical member is urged against the aperture at least partly by the pressure of air at the cowl inlet, and wherein, in use, the member is free to be moved sufficiently far into the cavity and away from the aperture such that it is no longer in contact with the aperture, and wherein the member is free to be rotated within the cavity in any direction, and wherein the portion of the cowl defining the aperture is a sharp edge.

2. A nozzle as claimed in claim 1, wherein the said at least one hole in the spherical member is a straight-sided bore extending through the spherical member.

3. A nozzle as claimed in claim 1, wherein there are a plurality of holes in the spherical member the holes all being substantially parallel to each other.

4. A nozzle as claimed in claim 1, wherein the nozzle includes a resilient member to urge the spherical member against the aperture.

5. A nozzle as claimed in claim 4, which includes a ring interposed between the resilient member and the spherical member.

6. A nozzle as claimed in claim 4, wherein the force exerted by the resilient member on the spherical member is at most barely sufficient in the absence of pressurised air at the inlet to support the weight of the spherical member.

7. A nozzle as claimed in claim 4, wherein the resilient member is a coil spring.

8. A nozzle as claimed in claim 1, wherein the member is not urged against the aperture except, in use, by air pressure at the inlet.

9. A nozzle as claimed in claim 1, wherein at least the portion of the cowl defining the aperture is made of a resilient material to provide a seal between the spherical member and the cowl when the spherical member is urged against the cowl.

10. A nozzle as claimed in claim 9, wherein the whole cowl is made of a resilient material.

11. A nozzle as claimed in claim 10, wherein the said resilient material is polyurethane rubber.

12. A nozzle as claimed in claim 1, wherein the spherical member is a hollow shell provided with orifices therein and wherein the spherical member includes tubes connecting opposed pairs of orifices together.

13. A ventilation nozzle comprising:
    a cowl having an inlet for receiving pressurized air, a substantially circular aperture and a cavity connecting the inlet and the aperture together,
    a substantially spherical member located in the cavity and having at least one hole extending therethrough, the spherical member having a diameter greater than that of the aperture and being rotatable to direct air passing through the said hole(s) in any desired direction, and wherein the spherical member is free to be moved within the cavity towards and away from the said aperture, and
    a resilient member acting on the spherical member to urge, in conjunction with the pressure of air at the cowl inlet, the spherical member into contact with the aperture, and wherein, in use, the member is free to be moved sufficiently far into the cavity and away from the aperture such that it is not longer in contact with the aperture, and wherein the member is free to be rotated within the cavity in any direction, and wherein the portion of the cowl defining the aperture is a sharp edge.

14. A method of supplying ventilation air from a duct to an atmosphere by means of a nozzle, which nozzle comprises:
    a cowl having an inlet for receiving pressurized air from the duct, a substantially circular aperture and a cavity connecting the inlet and the aperture together, and
    a substantially spherical member located in the cavity and having at least one hole extending therethrough, the spherical member having a diameter greater than that of the aperture and being rotatable to direct air passing through the said hole(s) in any desired direction, the spherical member being free to be moved within the cavity towards and away from the said aperture and being free to rotate in the cavity in any direction, and wherein the spherical member is free to be moved in the cavity such that it loses contact with said aperture, and wherein the method comprises supplying air to the cowl inlet at such a pressure that the spherical member is urged by the air pressure against the cowl aperture to form a seal therebetween, and wherein the portion of the cowl defining the aperture is a sharp edge, and the method further comprises the step of manually moving the spherical member away from the aperture such that it loses contact with the aperture and may be freely rotated upon a cushion of air.

15. An air flow control nozzle comprising:
a cowl having an inlet for receiving pressurized air, a substantially circular aperture and a cavity connecting the inlet and the aperture together, and
a substantially spherical member located in the cavity and having at least one hole extending therethrough, the spherical member having a diameter greater than that of the aperture and being rotatable to direct air passing through the said hole(s) in any desired direction, wherein the spherical member is free to be moved within the cavity towards and away from the said aperture and wherein, in use, the spherical member is urged against the aperture at least partly by the pressure of air at the cowl inlet, and wherein the spherical member is free to be rotated within the cavity in any direction and wherein the spherical member is free to be moved in the cavity away from the aperture such that it is not longer in contact with the aperture to allow rotation of the spherical member without contact between the spherical member and the aperture and with pressurized air serving as an air bearing to allow free rotation of the spherical member.

* * * * *

UNITED STATES PATENT AND TRADEMARK OFFICE
CERTIFICATE OF CORRECTION

PATENT NO.   :   4,848,669

DATED        :   July 18, 1989

INVENTOR(S)  :   GEORGE, Alan David

It is certified that error appears in the above-identified patent and that said Letters Patent is hereby corrected as shown below:

Title page:

Change inventor's name from "David A. George" to -- Alan D. George --.

In the Abstract: Line 5, change "end" to -- and --.

Column 5, line 50, Claim 1, change "hole" to -- hole(s) --.

Column 8, line 12, Claim 15, change "not" to -- no --.

Signed and Sealed this

Fifteenth Day of May, 1990

Attest:

HARRY F. MANBECK, JR.

*Attesting Officer*       *Commissioner of Patents and Trademarks*